US006965929B2

(12) United States Patent
Kumar

(10) Patent No.: US 6,965,929 B2
(45) Date of Patent: Nov. 15, 2005

(54) CONFIGURING A NETWORK DEVICE

(75) Inventor: Murari Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 883 days.

(21) Appl. No.: 09/895,279

(22) Filed: Jun. 29, 2001

(65) Prior Publication Data

US 2003/0005089 A1 Jan. 2, 2003

(51) Int. Cl.$^7$ ............................................. H04L 12/00
(52) U.S. Cl. ..................... 709/220; 709/221; 709/248; 709/249; 709/250
(58) Field of Search ................................. 709/220, 221, 709/248, 249, 250

(56) References Cited

U.S. PATENT DOCUMENTS

| | | | |
|---|---|---|---|
| 4,825,206 A | | 4/1989 | Brice et al. |
| 5,062,055 A | | 10/1991 | Chinnaswamy et al. |
| 5,138,615 A | | 8/1992 | Lamport et al. |
| 5,216,675 A | | 6/1993 | Mellar-Smith et al. |
| 5,408,618 A | * | 4/1995 | Aho et al. ................. 710/104 |
| 5,463,733 A | | 10/1995 | Forman et al. |
| 5,553,240 A | | 9/1996 | Madduri |
| 5,557,748 A | * | 9/1996 | Norris ........................ 709/220 |
| 5,574,860 A | | 11/1996 | Perlman et al. |
| 5,649,100 A | | 7/1997 | Ertel et al. |
| 5,692,120 A | | 11/1997 | Forman et al. |
| 5,724,510 A | | 3/1998 | Arndt et al. |
| 5,734,831 A | | 3/1998 | Sanders |
| 5,784,555 A | | 7/1998 | Stone |
| 5,805,785 A | | 9/1998 | Dias et al. |
| 5,819,042 A | | 10/1998 | Hansen |
| 5,822,531 A | | 10/1998 | Gorczyca et al. |
| 5,828,889 A | | 10/1998 | Moiin et al. |
| 6,061,740 A | * | 5/2000 | Ferguson et al. ........... 709/246 |
| 6,108,699 A | * | 8/2000 | Moiin ........................ 709/221 |
| 6,115,545 A | * | 9/2000 | Mellquist .................... 709/220 |

FOREIGN PATENT DOCUMENTS

| | | |
|---|---|---|
| EP | 0481231 | 4/1992 |
| EP | 0772126 A2 | 5/1997 |

OTHER PUBLICATIONS

Douglas E. Comer, [Internetworking with TCP/IP: Principles, Protocols, and Architecture], vol. 1, Chapters 9 and 21, 3$^{rd}$ Edition, 1995.

* cited by examiner

Primary Examiner—Fritz Fleming
Assistant Examiner—M. Farooq
(74) Attorney, Agent, or Firm—Fish & Richardson P.C.

(57) ABSTRACT

A system includes a first network device which receives a request for configuration information, a second network device, and a third network device which issues the request. The first network device is configured to respond to the request within a first time period and the second network device is configured to respond to the request within a second time period if the first network device does not respond to the request within the first time period.

26 Claims, 3 Drawing Sheets

CONFIGURING A NETWORK DEVICE

TECHNICAL FIELD

This invention relates to configuring a network device.

BACKGROUND

A local network, such as a local area network (LAN), is comprised of network devices, such as computers and their peripherals, that are internally addressable, but generally not externally addressable. That is, the network IP (Internet Protocol) addresses of such devices are unique within the local network. As a result, the devices can be addressed within the local network.

Heretofore, a DCHP (Dynamic Host Configuration Protocol) server was used to configure devices on a local network with appropriate internal IP addresses. The DHCP server was also used as an intermediary to an external network.

DESCRIPTION

Figure 1:
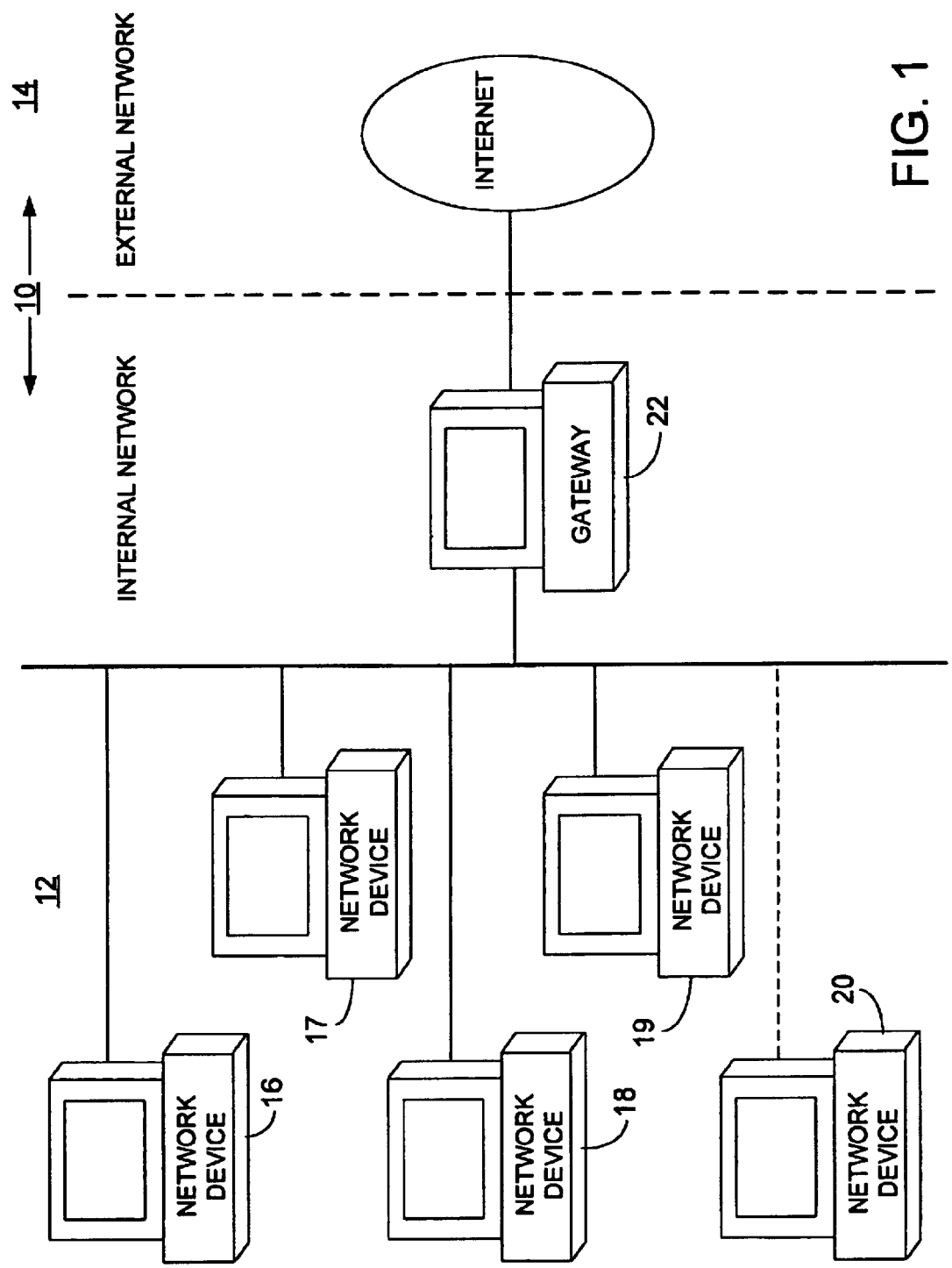
FIG. 1 is block diagram of a network that includes both internal (local) and external networks.

Referring to FIG. 1, a computer network 10 is shown. Computer network 10 is comprised of an internal (local) network 12, such as a home LAN, and an external network 14, such as the Internet. Devices 16 to 19 on internal network 12 and devices (not shown) on external network communicate via a gateway 22. Gateway 22 is a computer, such as a router, and includes its own IP address that is recognizable by devices on both internal network 12 and external network 14. The devices themselves may be computers or any type of networked peripheral device.

Devices on internal network 12 have internally-addressable IP (or other) addresses. These IP addresses are recognizable by devices on internal network 12, including gateway 22, but they are not generally recognizable by devices on external network 14.

Figure 2:
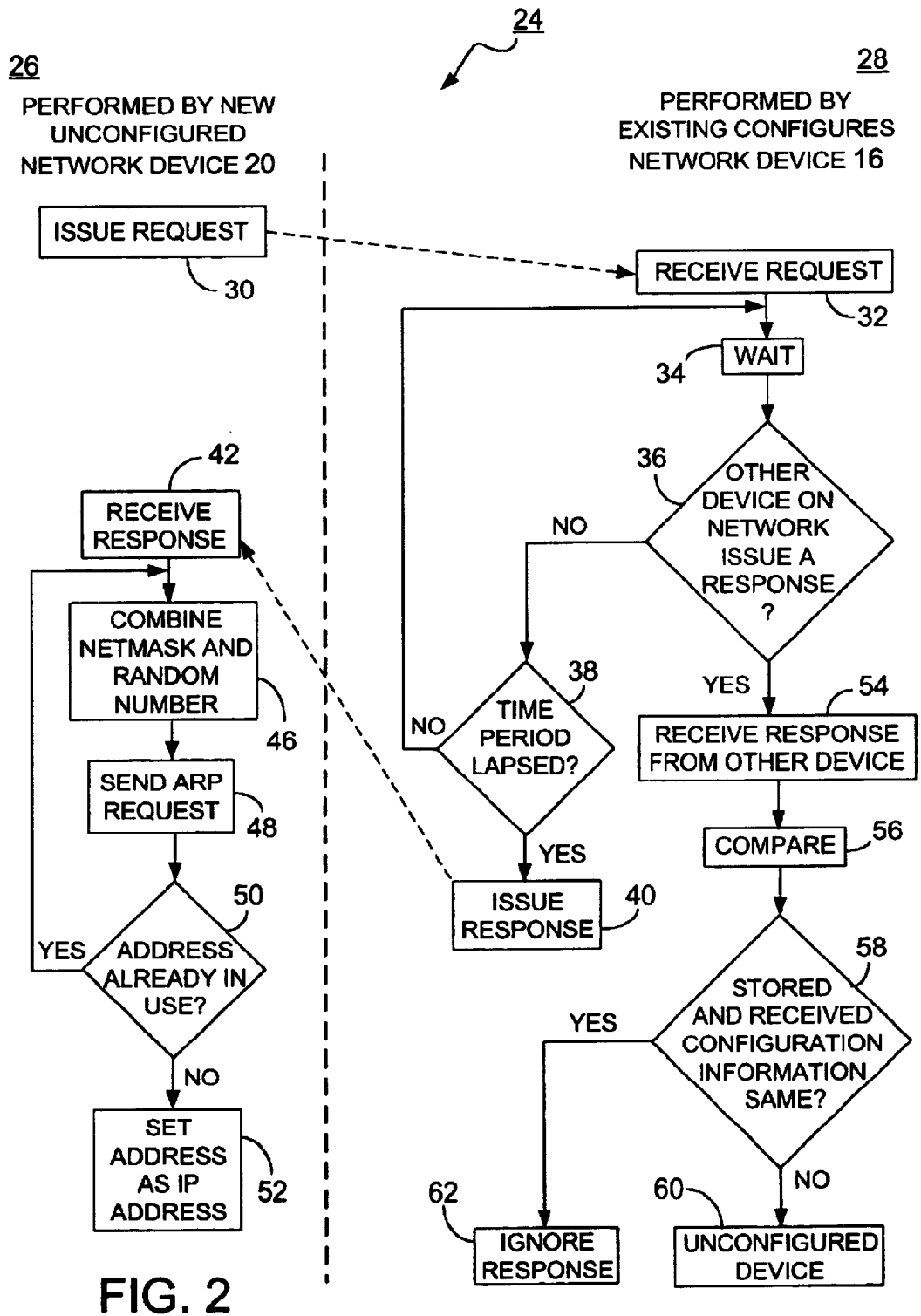
FIG. 2 is a flowchart showing a process for configuring devices on the internal network.

FIG. 2 shows process 24 for automatically assigning internally-addressable IP addresses to devices on internal network 12. Each such IP address is comprised of a subnet address for network 12 and a host portion for the device. Process 24 may be implemented without a DHCP server, thereby decreasing the complexity of the network and reducing the need for periodic manual reconfiguration of the DHCP server. Moreover, since process 24 assigns all devices with IP addresses having the same format, process 24 can be used with devices that run different operating systems.

In the example provided below, process 24 is used to configure a network device 20, which is being newly added to internal network 12. However, it is noted that process 24 can also be used to reconfigure existing network devices.

There are two "stages" to process 24. One stage 26 is performed by unconfigured device 20. The other stage 28 is performed by gateway 22 and existing devices 16 to 19 on the network (gateway 22 and existing devices 16 to 19 are configured in this example). In stage 26, device 20 issues (30) a request for configuration information. The request is broadcast over internal network 12 using, e.g., ICMP (Internet Control Message Protocol).

In this embodiment, the request is a combined ICMP message, which includes a router solicitation and an address mask request. The router solicitation may be an ICMP command for requesting the network IP address of a router, such as gateway 22. The address mask request may be an ICMP command for requesting the netmask for internal network 12. The netmask is an N (N>1) bit number associated with internal network 12 that is stored on devices on internal network 12.

Each of devices 16 to 19 and gateway 22 receives the issued (30) broadcast request. Any of devices 16 to 19 or gateway 22 may respond to the request by providing the responding device's IP address, the IP address of gateway 22, and the netmask (if there is no gateway on the network, the gateway address is not provided). For the purposes of this application, the IP address of the device and gateway 22 and the netmask are included within "configuration information", although other information may also fall under the rubric of "configuration information". ICMP may be used to transmit the response to the broadcast request.

Device 20 (after it is configured) uses the IP address of gateway 22 to send communications to external network 14 through gateway 22. Device 22 uses the netmask to establish its own internal IP address (for use on network 12), as described in more detail below.

Each existing device 16 to 19 on internal network 12, along with gateway 22, performs stage 28 of process 24. However, stage 28 is only described with reference to device 16. Device 16 receives (32) the request from device 20. Device 16 begins (34) a waiting period, during which device 16 waits for other devices 17, 18, 19 and gateway 22 to respond to the request. In more detail, each device (including the gateway) on internal network 12 is pre-assigned a time period. The time period for each device is unique relative to other devices on internal network 12 (each device is assigned a different time period). For example, device 19 may be assigned one second, device 18 may be assigned three seconds, device 17 may be assigned five seconds, and device 16 may be assigned seven seconds. It is also possible to have two or more devices with the same pre-assigned time period.

Upon receiving the request from device 20, each device (and gateway) waits for its predetermined time period to lapse before issuing a response. If another device responds before the predetermined time period for a particular device lapses, then that device does not issue a response. For example, assume that device 18 has an assigned time period of three seconds and device 17 has an assigned time period of five seconds. If device 18 responds after three seconds lapses, device 17 will not respond at all. Otherwise, device 17 will respond once five seconds have lapsed. This way, only one device responds to the request and there is a contingency in case one or more devices on internal network 12 go down. If two devices have the same pre-assigned time period, the requesting device uses the response that it receives first and ignores all other responses.

Accordingly, in stage 28, device 16 begins (34) to wait for its predetermined time period to lapse. If another device does not respond (36) and the predetermined time period for device 16 lapses (38), device 16 issues (40) a response; otherwise, device 16 continues to wait. The response contains network configuration information, including the IP address of gateway 22, the netmask, and the IP address of the responding device 16. The response may be broadcast to all devices on network 12 using ICMP, and includes a router advertisement (e.g., the IP address of gateway 22) and an address mask reply (e.g., the netmask).

In stage 26, device 20 receives (42) the response from device 16. Device 20 uses the reply to configure itself. What is meant by "configure", in this context, is to generate a new IP address for device 20 and to store the IP address of the gateway for communication with external network 14. Generally, the IP address of device 20 is not addressable outside of network 12, but the invention is not limited as such. Device 20 generates a new IP address using the netmask. Device 20 generates the network address by combining (46) the netmask with the network IP address of device 16 and a randomly-generated number. Note that if no device responds to the request, a default netmask, which may be pre-stored on device 20, is used to generate the IP address of device 20.

To generate its IP address, device 20 performs a logical AND operation using the netmask and the IP address of device 16. The resulting product contains a subnet portion followed by zeros (or other unused bits). For example, the IP address of device 16 may be 32 bits and the netmask may be 24 bits. The logical product, therefore, is a 32 bit number, the last 8 bits of which are all zero. In this example, the first 24 bits of the product are the subnet address. The last 8 bits are then replaced with the host portion bits.

Device 20 provides the host portion bits by generating a random number having the appropriate number of bits, e.g., 8 in the above example. Device 20 replaces the non-subnet portion of the logical product (e.g., the lower order 8 bits in the above example) with the random number. The result is a tentative IP address for device 20. Whether this IP address is already in use on network 12 is then determined.

Device 20 determines if the generated IP address is already in use on internal network 12 by sending (48) an ARP (Address Resolution Protocol) request, containing the IP address, over internal network 12. If another device responds to the ARP request with an indication that the IP address specified in the ARP request is already in use (50), device 20 generates a new IP address in the manner described above and sends a new ARP request. This process is repeated until device 20 determines that the new IP address is unique within internal network 12. Once the IP address is determined to be unique, device 20 sets (52) that IP address as the IP address of device 20. This may be done by storing the IP address in a memory on device 20.

Referring back to stage 28, if another device on internal network 12 issues a response before device 16's time period has lapsed (36), device 16 receives 54 the response. (Device 16 receives the response because the response is broadcast over internal network 12 using, e.g., ICMP.) Device 16 compares (56) the configuration information in the response to corresponding configuration information that is stored on device 16. If all or part of the stored configuration information does not match the configuration information in the response, device 16 assigns itself to be the unconfigured device and reconfigures itself. That is, device 16 takes the place of device 20 and performs process 24 in the manner described herein. If the stored configuration information matches the configuration information in the response, device 16 ignores (62) the response.

Figure 3:
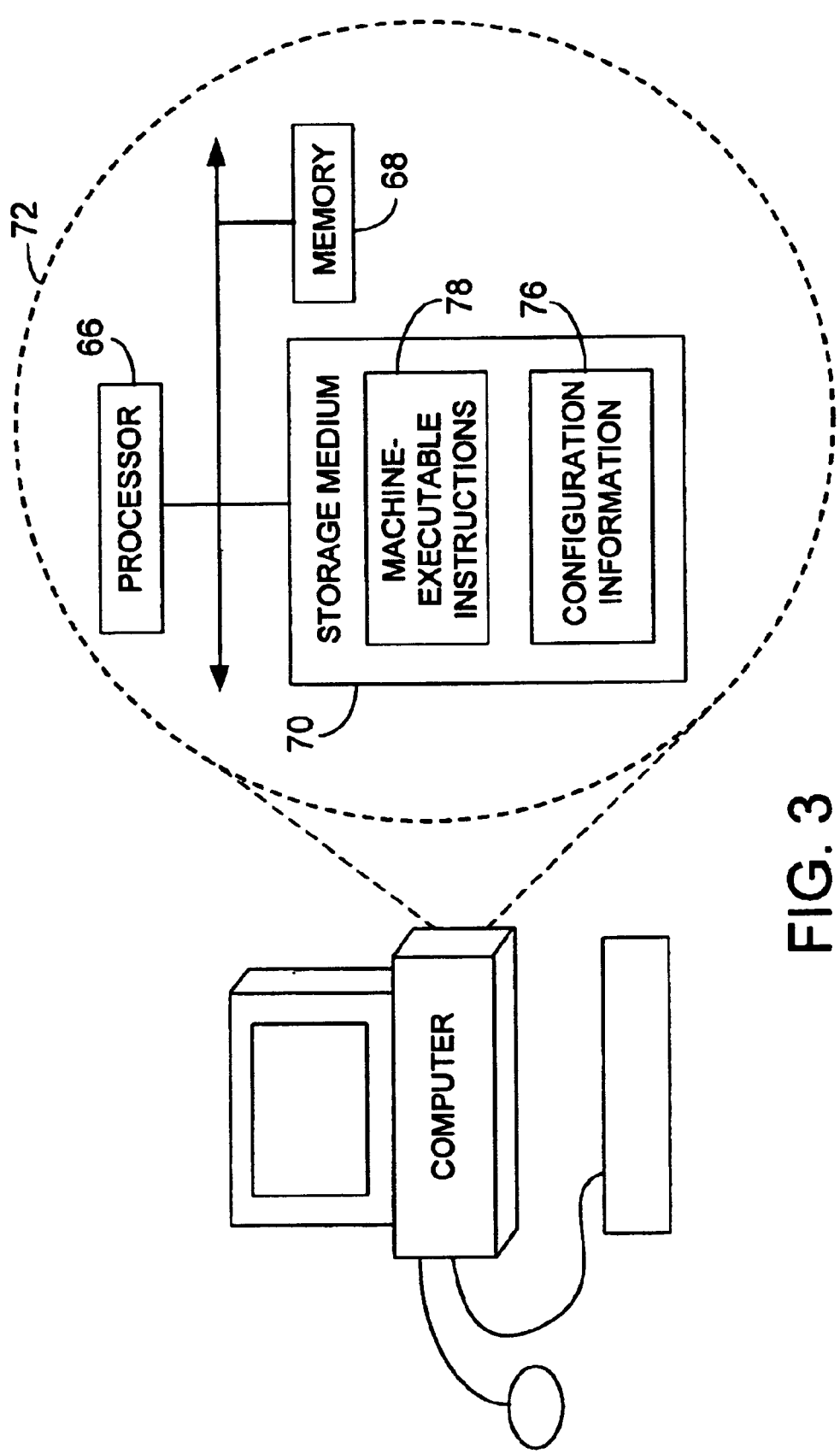
FIG. 3 is a close-up view of hardware on which stages of the process of FIG. 2 may be executed.

FIG. 3 shows a close-up view of a network device, such as devices 16 and 20. The device includes a processor 66, a memory 68, and a storage medium 70 (see view 72). Storage medium 70 stores configuration information 76 and machine-executable instructions 78. For device 20, machine-executable instructions 78 would be executed by processor 66 out of memory 68 in order to perform stage 26 of process 24. For devices 16 to 19 and gateway 22, machine-executable instructions 78 would be executed by processor 66 out of memory 68 in order to perform stage 28 of process 24.

Although a personal computer is shown in FIG. 3, stages 26 and 28 of process 24 are not limited to use with the hardware and software of FIGS. 1 and 3. They may find applicability in any computing or processing environment. Stages 26 and/or 28 of process 24 may be implemented in hardware, software, or a combination of the two. Stages 26 and/or 28 of process 24 may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform stages 26 and/or 28 of process 24 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium/ article (e.g., CD-ROM, hard disk, or magnetic diskette) that is readable by a general or special purpose programmable computer for configuring and operating the computer when the storage medium or device is read by the computer to perform stages 26 and/or 28 of process 24. Stages 26 and/or 28 of process 24 may also be implemented as a machine-readable storage medium, configured with a computer program, where, upon execution, instructions in the computer program cause a machine to operate in accordance with stages 26 and/or 28 of process 24.

The invention is not limited to the specific embodiments described herein. The invention can be used with any type of wired (e.g., Ethernet) or wireless (e.g., ATM—Asynchronous Transfer Mode) networks. The invention can be used with any type of processing device. The invention is not limited to use with the protocols specified herein, such as ICMP and ARP. The invention is not limited to the time periods set forth above or to networks having a specific number of devices.

Other embodiments not described herein are also within the scope of the following claims.

What is claimed is:

1. A method, performed by a first network device, for use in configuring a second network device, comprising:
   receiving a request for configuration information from the second network device; and
   determining whether to respond to the request based on at least one of (i) lapse of a predetermined time period, and (ii) whether another device on the network issues a response to the request;
   wherein if another device on the network issues a response, the first network device does not issue a response.

2. The method of claim 1, wherein the predetermined time period is unique to the first network device relative to other devices on the network.

3. The method of claim 1, wherein if another device on the network issues a response, the first network device:

receives the response from the other device;

compares information in the response to stored configuration information; and determines whether to reconfigure itself based on the comparison.

4. The method of claim 3, wherein, if the information in the response does not match the stored configuration information, the first network device reconfigures itself.

5. The method of claim 1, wherein the request comprises a combined router solicitation and an address mask request.

6. The method of claim 1, wherein a response to the request comprises a combined router advertisement and an address mask reply.

7. The method of claim 1, wherein the first network device comprises one of a peer of the second network device and a router to an external network.

8. A system comprising:

a first network device which receives a request for configuration information;

a second network device; and a third network device which issues the request;

wherein the first network device is configured to respond to the request within a first time period and the second network device is configured to respond to the request within a second time period if the first network device does not respond to the request within the first time period; and wherein if the first network device responds to the request, the second network device does not respond to the request.

9. The system of claim 8, wherein the second network receives a response to the request issued by the first network device, compares information in the response to stored configuration information, and determines whether to reconfigure itself based on the comparison.

10. The system of claim 9, wherein, if the information in the response does not match the stored configuration information, the second network device reconfigures itself.

11. The system of claim 8, wherein the request comprises a combined router solicitation and an address mask request.

12. The system of claim 8, wherein a response to the request comprises a combined router advertisement and an address mask reply.

13. An article comprising a machine-readable storage medium which stores instructions that are executed by a first network device to configure a second network device, the instructions causing the first network device to:

receive a request for configuration information from the second network device; and determine whether to respond to the request based on at least one of (i) lapse of a predetermined time period, and (ii) whether another device on the network issues a response to the request;

wherein if another device on the network issues a response, the instructions cause the first network device not to issue a response.

14. The article of claim 13, wherein the predetermined time period is unique to the first network device relative to other devices on the network.

15. The article of claim 13, wherein if another device on the network issues a response, the instructions cause the first network device to:

receive the response from the other device;

compare information in the response to stored configuration information; and determine whether to reconfigure itself based on the comparison.

16. The article of claim 15, wherein, if the information in the response does not match the stored configuration information, the instructions cause the first network device to reconfigure itself.

17. The article of claim 13, wherein the request comprises a combined router solicitation and an address mask request.

18. The article of claim 13, wherein a response to the request comprises a combined router advertisement and an address mask reply.

19. The article of claim 13, wherein the first network device comprises one of a peer of the second network device and a router to an external network.

20. A first network device for use in configuring a second network device, the first network device and the second network device being on a network, the first network device comprising:

memory that stores executable instructions; and a processor that executes the instructions to:

receive a request for configuration information from the second network device; and determine whether to respond to the request based on at least one of (i) lapse of a predetermined time period, and (ii) whether another device on the network issues a response to the request;

wherein if another device on the network issues a response, the first network device does not issue a response.

21. The first network device of claim 20, wherein the predetermined time period is unique to the first network device relative to other devices on the network.

22. The first network device of claim 20, wherein if another device on the network issues a response, the first network device:

receives the response from the other device;

compares information in the response to stored configuration information; and determines whether to reconfigure itself based on the comparison.

23. The first network device of claim 22, wherein, if the information in the response does not match the stored configuration information, the first network device reconfigures itself.

24. The first network device of claim 20, wherein the request comprises a combined router solicitation and an address mask request.

25. The first network device of claim 20, wherein a response to the request comprises a combined router advertisement and an address mask reply.

26. The first network device of claim 20, wherein the first network device comprises one of a peer of the second network device and a router to an external network.

* * * * *